United States Patent
Wiest et al.

(10) Patent No.: US 7,373,839 B2
(45) Date of Patent: May 20, 2008

(54) APPARATUS FOR DETERMINING AND/OR MONITORING VOLUME- AND/OR MASS-FLOW OF A MEDIUM IN A PIPELINE

(75) Inventors: Achim Wiest, Weil am Rhein (DE); Andreas Berger, Therwil (CH); Patrick Oudoire, Soultz (FR)

(73) Assignee: Endress + Hauser Flowtec AG, Reinach (CH)

( * ) Notice: Subject to any disclaimer, the term of this patent is extended or adjusted under 35 U.S.C. 154(b) by 0 days.

(21) Appl. No.: 10/576,280

(22) PCT Filed: Oct. 13, 2004

(86) PCT No.: PCT/EP2004/011508

§ 371 (c)(1),
(2), (4) Date: Feb. 13, 2007

(87) PCT Pub. No.: WO2005/038410

PCT Pub. Date: Apr. 28, 2005

(65) Prior Publication Data

US 2007/0234791 A1  Oct. 11, 2007

(30) Foreign Application Priority Data

Oct. 15, 2003  (DE) ................ 103 48 676

(51) Int. Cl.
*G01F 1/32* (2006.01)
(52) U.S. Cl. .................................. 73/861.23
(58) Field of Classification Search ............ 73/861.23, 73/861.06, 861.25, 209 V, 861.18, 861.27; 342/124; 267/908
See application file for complete search history.

(56) References Cited

U.S. PATENT DOCUMENTS

| | | | |
|---|---|---|---|
| 4,374,477 A | 2/1983 | Kikuchi | |
| 4,454,767 A | 6/1984 | Shinkai | |
| 5,131,278 A | 7/1992 | Baumoel | |
| 5,438,868 A * | 8/1995 | Holden et al. | 73/290 V |
| 5,533,408 A * | 7/1996 | Oldenziel et al. | 73/861.18 |
| 6,009,760 A * | 1/2000 | Jakkula et al. | 73/861.06 |

FOREIGN PATENT DOCUMENTS

| | | |
|---|---|---|
| DE | 78 38 154 U1 | 5/1980 |
| DE | 285 637 A5 | 12/1990 |
| EP | 0 974 815 A1 | 1/2000 |
| WO | WO 88/08516 | 11/1988 |
| WO | WO 95/17650 | 6/1995 |

* cited by examiner

Primary Examiner—Jewel V Thompson
(74) Attorney, Agent, or Firm—Bacon & Thomas, PLLC

(57) ABSTRACT

An apparatus for determining and/or monitoring volume- and/or mass-flow of a medium flowing through a pipeline in a stream direction. At least two ultrasonic sensors are included, which are secured in a defined measuring positional relationship on the outer wall of the pipeline and alternately emit and receive ultrasonic measuring signal. A control/evaluation unit, which determines volume- and/or mass-flow of the medium in the pipeline on the basis of the travel time difference of ultrasonic measuring signals in the stream direction and opposite to the stream direction is also provided. For assuring rapid mounting and demounting of the ultrasonic flow measuring device on a pipeline, the at least two ultrasonic sensors are secured on a pliers-like clamping unit, which is embodied in a manner such that the ultrasonic sensors are brought into a measuring positional relationship by simple clamping onto the pipeline.

11 Claims, 7 Drawing Sheets

APPARATUS FOR DETERMINING AND/OR MONITORING VOLUME- AND/OR MASS-FLOW OF A MEDIUM IN A PIPELINE

FIELD OF THE INVENTION

The invention relates to an apparatus for determining and/or monitoring volume- and/or mass-flow, e.g. flowrate, of a medium flowing in a stream direction through a pipeline.

BACKGROUND OF THE INVENTION

The apparatus includes: At least two ultrasonic sensors, which are secured in a defined measuring positional relationship, i.e. in defined measuring positions, externally on the pipeline and which alternately emit and receive ultrasonic measuring signals; and a control/evaluation unit, which determines the volume- and/or mass-flow of the medium in the pipeline on the basis of the travel time difference of the ultrasonic measuring signals, in the stream direction, and opposed to the stream direction.

Clamp-on ultrasonic flow measuring devices of the above-described kind, which determine volume flow by means of the so-called travel time difference method, are employed for many uses in process and automation technology. They make it possible to determine volume flow contactlessly in a containment, e.g. in a pipeline. To this end, the ultrasonic measuring signals are radiated at a predetermined angle into the pipeline, in which the medium is located. The measuring positional relationship of the ultrasonic sensors on the pipeline depends on the inner diameter of the pipeline, on the wall thickness thereof, and on the velocity of sound in the material of the pipeline. In order to provide a reliable measured variable for the flow, these parameters must be known.

Known are clamp-on flow measuring devices in which the ultrasonic transducers are pressed externally onto the pipeline by means of a clamping lock. Clamp-on flow measuring devices are described, for example, in European patent EP 0 686 255 B1, U.S. pat. No. 4,484,478 or U.S. pat. No. 4,598,593. Additionally, it is known to apply the clamp-on measuring devices to the pipeline using chains, hook and loop bands (e.g. Velcro hook and loop bands), or screws. It is clear that the known methods for positioning ultrasonic sensors are rather time consuming.

SUMMARY OF THE INVENTION

An object of the invention is to provide a clamp-on flow measuring device enabling rapid mounting onto, or demounting from, a pipeline of largely arbitrary outer diameter.

The object is achieved by providing that two ultrasonic sensors are secured to a pliers-like clamping unit embodied such that the ultrasonic sensors can be clamped onto the pipeline. Preferably, the pliers-like clamping unit is so constructed, that, after clamping onto the pipeline, the two ultrasonic sensors find themselves automatically in the correct measuring positional relationship —and, indeed, largely independently of the outer diameter of the pipeline. The upper limit of the pipeline diameter is solely a matter of design and is a function, especially, of the achievable opening angle of the pliers-like clamping unit.

An advantageous further development of the apparatus of the invention provides that the clamping unit is embodied in such a manner that the two ultrasonic sensors are arranged in the measuring positional relationship in a two, or more, traverse arrangement on a surface element essentially parallel to the longitudinal axis of the pipeline. Alternatively, it is provided, that the clamping unit is embodied in such a manner that the two ultrasonic sensors are arranged in the measuring positional relationship on opposite sides of the pipeline in a one-traverse arrangement or in a multiple one-traverse arrangement.

To be seen as especially simple is the embodiment in which the pliers-like clamping unit includes a first portion and a second portion. Especially, the first portion is composed of two lever arms, which are coupled together in their central regions via a pivoting connection. Preferably, a first rotation sensor is provided at the pivoting connection, for registering the angle between the two lever arms. On the basis of the measured values delivered by the rotation sensor, the control/evaluation unit determines the outer diameter of the pipeline.

The second portion is composed preferably of the following components:
   two guide rails arranged in V-shape and coupled together in their connected end regions via a pivot connection;
   two securely clampable, pivot connections, which are provided in the free end regions of the guide rails and in the end regions of a transverse member;
   two connection pieces, which are rigidly mounted on the pivot connections and to which the ultrasonic sensors are secured;
   the transverse member, which is rigidly connected with the first lever arm of the first portion;
   a holder, which is connected with the second lever arm of the first portion.

As already mentioned above, it is important, in the case of clamp-on flow measuring devices, to take into consideration the wall thickness of the pipeline in calculating the travel times of the ultrasonic measuring signals. The wall thickness of the pipeline is either known, or it can be determined by means of ultrasound via an ultrasonic sensor. Therefore, in an advantageous embodiment of the apparatus of the invention, a compensating unit is provided, via which the wall thickness of the pipeline can be accounted for essentially automatically. To this end, a second rotation sensor and a length sensor are assigned to the compensating unit. The rotation sensor and the length sensor transmit their measured data to the control/evaluation unit.

BRIEF DESCRIPTION OF THE DRAWINGS

The invention will now be explained in greater detail on the basis of the appended drawing, the figures of which show as follows.

DESCRIPTION OF THE PREFERRED EMBODIMENTS

Figure 1:
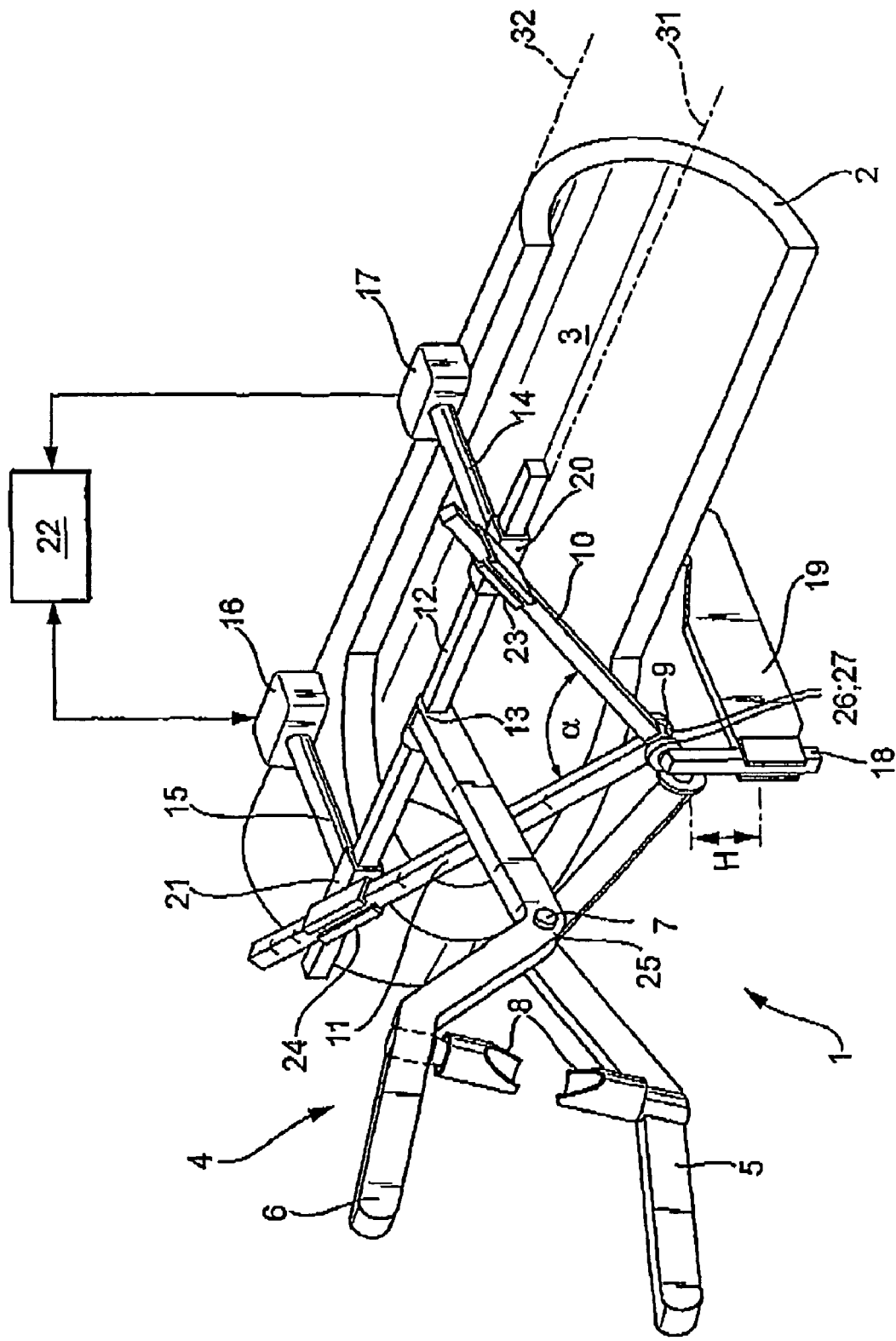
FIG. 1 a perspective view of a preferred form of embodiment of the ultrasonic flow measuring device of the invention.
Figure 2:
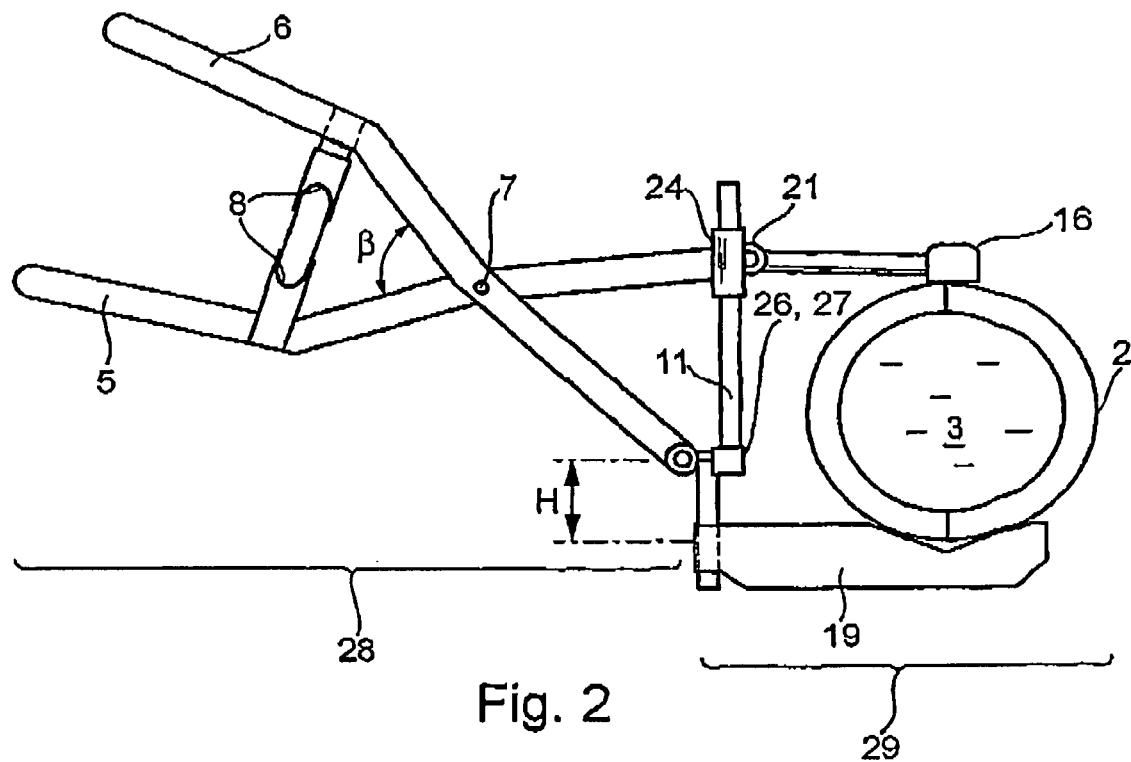
FIG. 2 a cross section of the form of embodiment shown in FIG. 1.

FIG. 1 is a perspective view of a preferred form of embodiment of the ultrasonic flow measuring device 1 of the invention for determining and/or monitoring volume- or mass-flow, for instance flowrate, of the medium 3 through the pipeline 2. FIG. 2 provides a cross sectional view of the form of embodiment shown in FIG. 1. The ultrasonic flow measuring device 1 works according to the travel time difference principle: The difference of the travel times of ultrasonic measuring signals traversing a medium 3 in the pipeline 2, in the stream direction and opposite to the stream direction, is proportional to the flow velocity of the medium 3. In the case of known inner diameter of the pipeline 2, the volume flowrate can be determined. If, additionally, the density of the flowing medium 3 is known, then the mass flowrate through the pipeline 2 can be determined.

In the illustrated case, the ultrasonic measuring signals are alternately emitted and received by the two ultrasonic sensors 16, 17. The two ultrasonic sensors 16, 17 are positioned on the outer surface 32 of the pipeline 2 extending parallel to the longitudinal axis 31 is that a maximum fraction of the measuring signals emitted from a first ultrasonic sensor of the ultrasonic sensors 16, 17 is received in the second ultrasonic sensor. The two ultrasonic sensors 16, 17 are situated in a so-called two-traverse arrangement. The determining of the travel time difference of the ultrasonic measuring signals and the determining of the volume- or mass-flowrate is done in the control/evaluation unit 22.

The ultrasonic flow measuring device 1 of the invention can be applied to the pipeline 2 in the correct measuring position using a constructively very simple mechanism. Especially, the mechanism can be adapted, without problem, to largely arbitrary outer diameters of the pipeline 2. A prerequisite for this is, merely, to a first approximation, that the sound velocity, or the index of refraction, of the medium is known. Preferably, the mechanism is so embodied, that the correct measuring position is automatically achieved for different outer diameters of the pipeline 2. In the illustrated case, the mechanism is so embodied, that the clamping action is produced via the two ultrasonic sensors 16, 17, the holder 19, and the compression spring 8, which is arranged between the two lever arms 4, 5. Of course, it is also possible so to embody the ultrasonic measuring device 1 of the invention, that the ultrasonic sensors 16, 17 are mounted in their measuring positions in mutually opposing positions of the pipeline 2 in a so-called one-traverse arrangement. Another variant of the arrangement is the so-called double, or more, one-traverse arrangement.

Consider FIG. 1 more closely. As already indicated, an essential component of the flow measuring device 1 of the invention is the pliers-like clamping unit 4, via which the ultrasonic sensors 16, 17 can be secured to the pipeline 3 in a simple manner. The clamping unit 4 is composed of a first portion 28 and a second portion 29 (FIG. 2). The first portion 28 has two lever arms 5, 6 arranged in a plane and journalled movably relative to one another via the pivot connection 7. The construction of the first portion 28 of the clamping unit 4 corresponds to the construction of a scissors or pliers; the second portion 29 essentially corresponds to the gripping portions of a pliers.

The second portion 29 is composed, in the illustrated case, of the following components: Two guide rails 10, 11 arranged in V-shape and coupled in their connected end regions via the pivot connection 9; two pivot connections 20, 23; 21, 24 provided in the 'free' end regions of the guide rails 10, 11; two connecting pieces 14, 15, to which the ultrasonic sensors 16, 17 are secured; the transverse member 12, and the holder 19. The pivot connections 20, 23; 21, 24 are each implemented by means of two pivotably and securely clampably arranged, tubular pieces. In each case, one tubular piece 23, 24 is secured in an end region of a respective one of the guide rails 10, 11. These tubular pieces 23, 24 are pivotably and lockably connected with the tubular pieces 20, 21, which are arranged movably on the transverse member 12. The tubular pieces 20, 23; 21, 24 can be locked in different angular positions relative to one another. For the purpose of correct positioning of the two ultrasonic sensors 16, 17 relative to one another, the angle α between the two guide rails 10, 11 is so set as a function of the medium flowing in the pipeline 2 and as a function of the predetermined inner diameter of the pipeline 3, that the ultrasonic measuring signals, which are emitted from an ultrasonic sensor 16; 17, are received in the respective other ultrasonic sensor 17; 16.

For determining the angle β (FIG. 2), a rotation transmitter 25 is provided in the region of the pivot connection 7 connecting the two guide rails 10, 11 securely together. On the basis of the data delivered by the rotation transmitter, the control/evaluation unit 22 determines the outer diameter $D_a$ of the pipeline. See FIG. 6. On the basis of the included angle β and the fixed lengths of the linkages of the pliers-like clamping unit 4, this calculation can occur in unequivocal manner. With knowledge of the diameter $D_a$ and the wall thickness d of the pipeline 2, the inner diameter $D_i$ and, thus, the inner area of the pipeline 2 can be calculated. In an advantageous embodiment of the apparatus of the invention, it is additionally provided that the ultrasonic sensors are so embodied that they, e.g. arranged in a housing, can perform both the wall thickness d measurement (by measuring the velocity of sound on the perpendicular sound path) and the flowrate measurement (by measuring the velocity of sound on the inclined sound path). In a practical reduction to practice, this embodiment can be implemented via two piezoelements, which radiate into the pipeline 2 at different angles.

The determining of the variables relevant for the flowrate measurement proceeds, thus, essentially automatically: The operator, thus, does not need, in this last-mentioned, preferred embodiment, to feed-in any additional information concerning the geometry of the pipeline 2. It is sufficient in this embodiment to provide the control/evaluation unit with the information concerning the material that the pipe wall is made of. The information about the corresponding sound velocity $c_R$ in the pipe wall is then, for example, taken from a table stored in the control/evaluation unit 22. In this way, the wall thickness d of the pipeline 2 can be calculated from the measured travel time T between two echo signals reflected on opposing areas of the pipe wall, and the sound velocity $c_R$, according to the following formula:

$$d = c_R * T/2$$

With knowledge of the outer diameter $D_a$ of the pipeline 2, the inner diameter $D_i$ of the pipeline 2 and the wall thickness d of the pipeline 2, it is then possible, on the basis of the travel time of an echo signal $T_M$, that, in turn, is reflected on the tube wall lying opposite the ultrasonic sensor, to deduce the velocity of sound $c_M$ in the medium, in manner analogous to the determination of the wall thickness d. The corresponding formula is:

$$c_M = d_i/(T_M/2)$$

Then, the angle α can be determined according to the following formula:

$$\alpha = 2 * a\sin\left(\frac{c_M}{c_K} * \sin\alpha_K\right)$$

where $\alpha_K$ is the angle, as measured with respect to the perpendicular to the exit surface, at which the ultrasonic signal radiates in the ultrasonic sensor, with this angle usually being specified by the manufacturer, and $c_K$ is the velocity of sound in the porting body 33 of the ultrasonic sensor 16; 17; this is also known from data supplied by the manufacturer.

According to the invention, the spacing of the ultrasonic sensors 16, 17 along the surface element 32 of the pipeline 2 is set automatically as a function of the outer diameter $D_a$ of the pipeline 2, as soon as the ultrasonic flow measuring device 1 is clamped securely on the pipeline 2. To this end, the tubular pieces 23, 24, which are secured to the guide rails 10, 11, are connected at the angle α rigidly with the tubular pieces 20, 21, which are movably arranged on the transverse member 12. The angle α of the two guide rails 10, 11 relative to the transverse member 12 is so set, that the correct measuring positions of the ultrasonic sensors 16, 17 are assumed as a function of a predetermined outer diameter of the pipeline 2 and as a function of the velocity of sound in the medium 3 flowing in the pipeline 2. The connecting pieces 14, 15, which carry the ultrasonic sensors 16, 17, are rigidly connected with the two tubular pieces 20, 21 movably arranged on the transverse member 12. This subject matter is evident on the basis of a comparison of the clamping apparatus as presented in the two FIGS. 9 and 10.

The transverse member 12 is rigidly connected in its central region with the end region of the lever arm 5. Via the connection of the tubular pieces 20, 21 with the connecting pieces 14, 15, a change of the angular interrelationship of the two guide rails 10, 11 is converted into a translational movement of the connection pieces 14, 15 and the ultrasonic sensors 17, 18 connected securely therewith, relative to the transverse member 12. If the outer diameter $D_a$ of the pipeline 2 is smaller than shown in FIG. 1, then the two ultrasonic sensors 16, 17 are automatically positioned nearer one another in the clamping of the clamping unit 4 onto the pipeline 2. If the outer diameter $D_a$ is greater, then the two ultrasonic sensors 16, 17 automatically end-up farther apart from one another. If the inner diameter of the pipeline 2 and the index of refraction of the medium 3 are known, then the clamp-on ultrasonic flow measuring device 1 of the invention can be mounted very rapidly into the correct measuring position on pipelines 2 of any outer diameter. The eligible diameters are only limited by the dimensions selected in the design of the device of the invention.

The clamping unit 4 is fixed in the measuring position on the pipeline 2 via the restoring force exerted by the compression spring 8. Compression spring 8 is arranged in the region of the two free end regions of the two lever arms 5, 6.

For the purpose of calculating the correct travel time of the ultrasonic measuring signals, it is necessary to take the wall thickness d of the pipeline 2 into consideration. Such is done in the form of embodiment of the device of the invention shown in FIG. 1 via a height displacement of the holder 19 and, therefore, via a height displacement of the two guide rails 10, 11 arranged in the angle α. To this end, a length sensor 27 is preferably provided in the region of the pivot connection 9. If the refraction in the tube wall is e.g. known via the sound velocity $c_R$ and thickness d of the pipe wall, then the compensating height H can be calculated from the following formula:

$$H = H' + d$$

Figure 6:
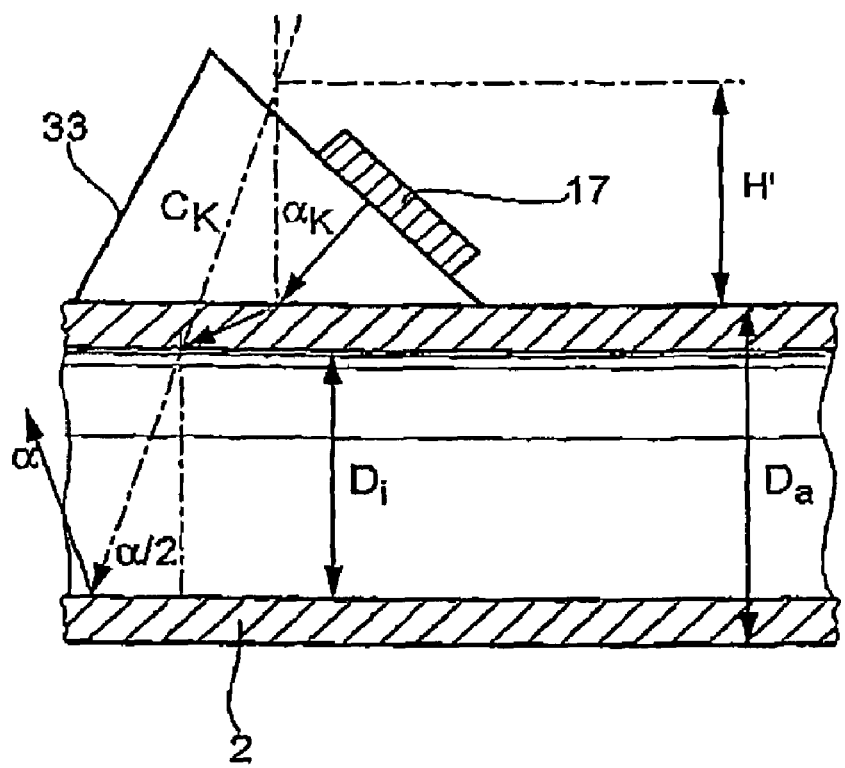
FIG. 6 a schematic representation of the sound path of an ultrasonic measuring signal.
Figure 7:
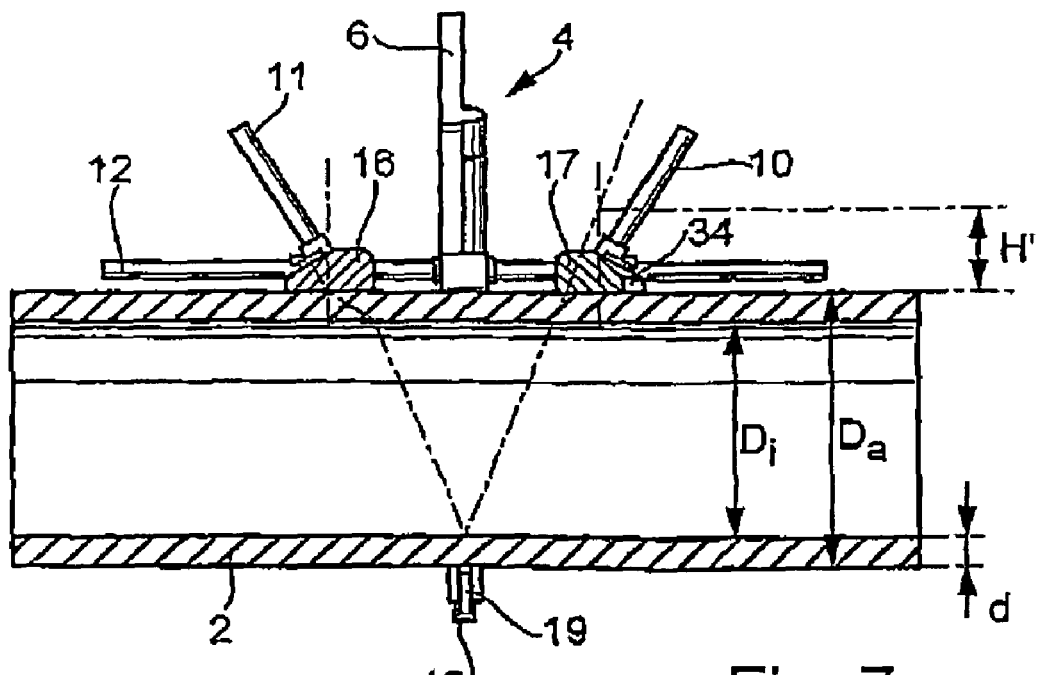
FIG. 7 a schematic drawing for determining the height displacement of the flow measuring device of the invention, in the case of compensating a wall thickness d.
Figure 8:
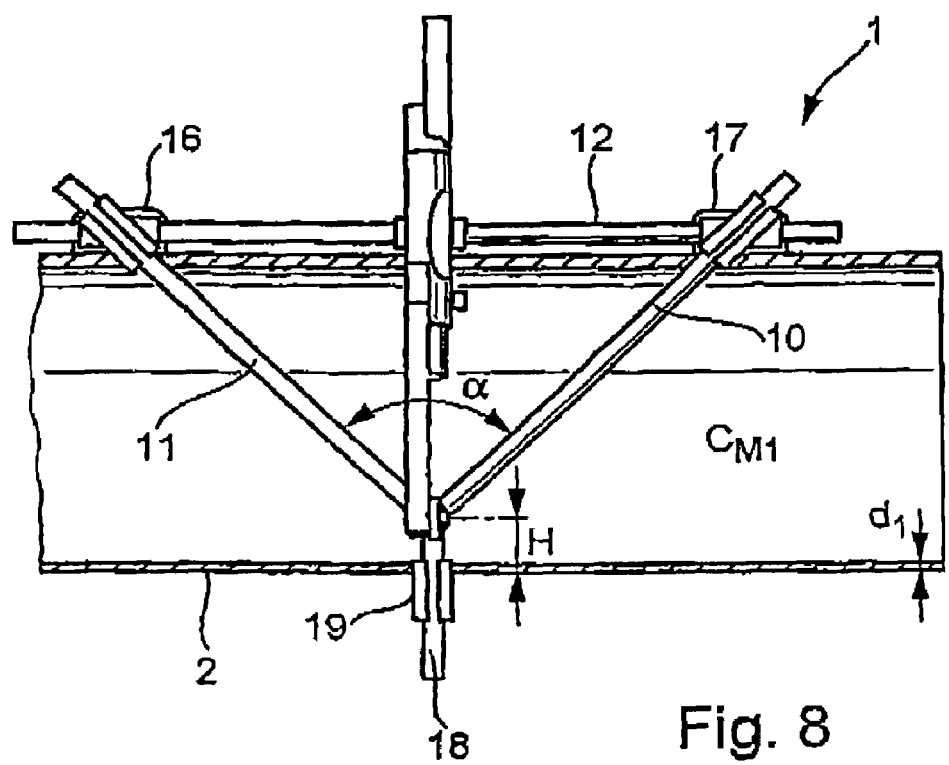
FIG. 8 a schematic presentation of the apparatus of the invention in the case of compensation for a thin pipe wall $d_1$.
Figure 9:
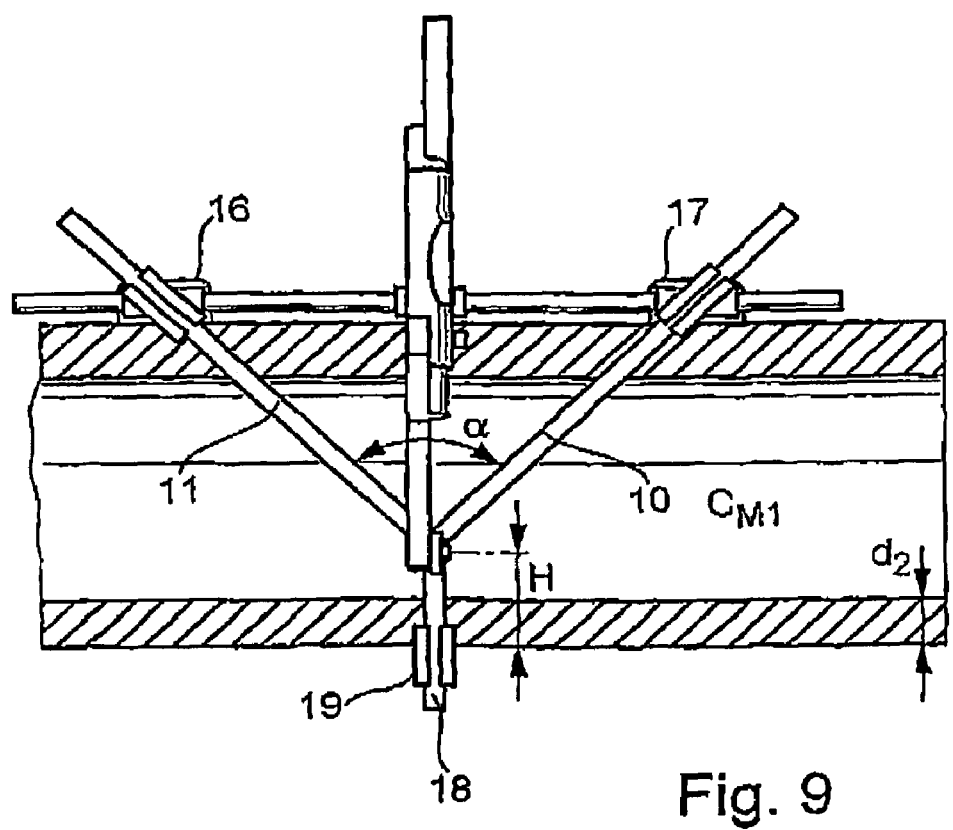
FIG. 9 a schematic presentation of the apparatus of the invention in the case of compensation for a thick pipe wall $d_2$.
Figure 10:
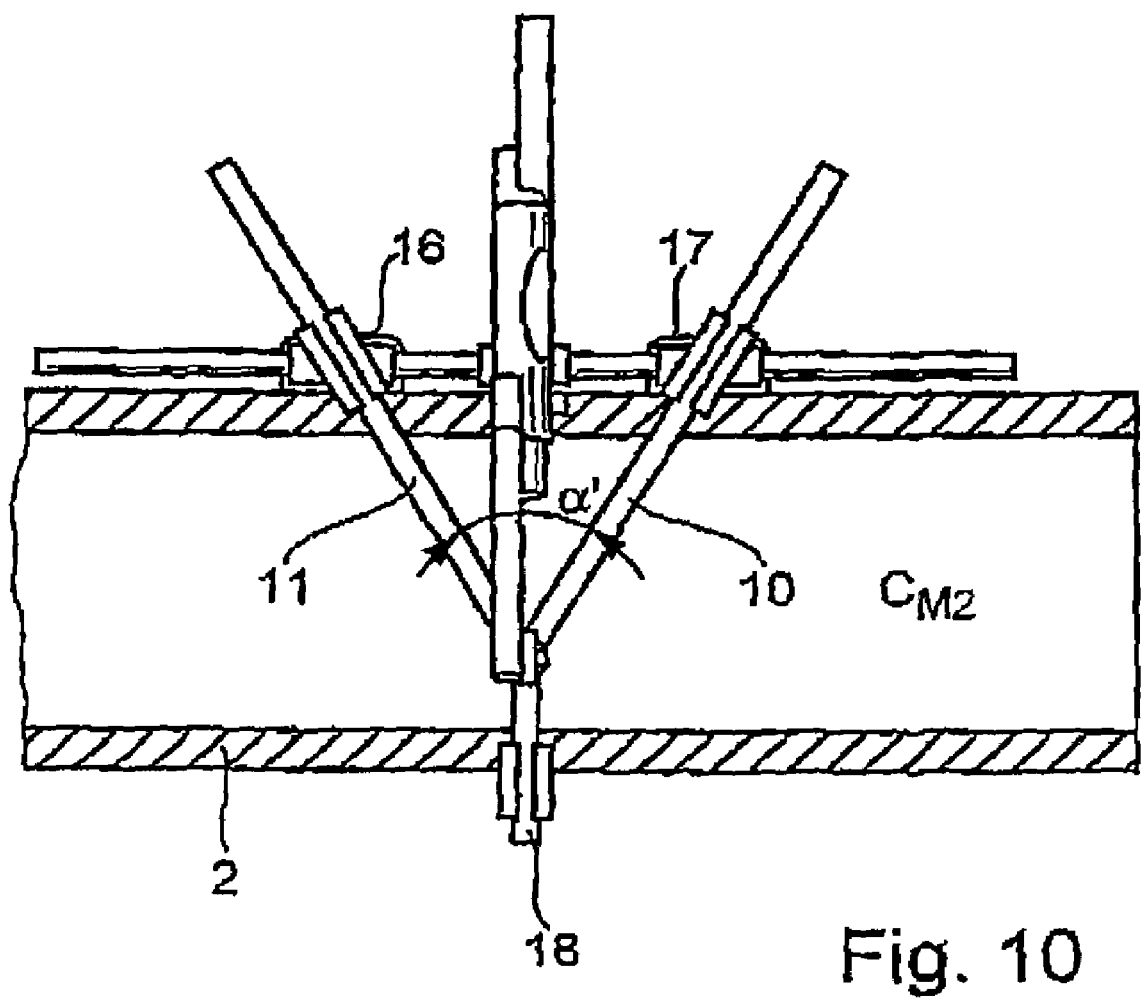
FIG. 10 a schematic presentation of the angle of the linkages of the pliers-like clamping unit in the case of a strongly refracting, measured medium.

The corresponding subject matter is sketched in FIG. 6. The compensating height H can be set automatically with a linear drive and/or manually with a length sensor (resistance sensor) or a measuring scale. For a manual setting, a set screw or locking at the correct position is still needed. A comparison of the two FIGS. 8 and 9 shows the compensating height H for two different wall thicknesses d1, d2.

Figure 3:
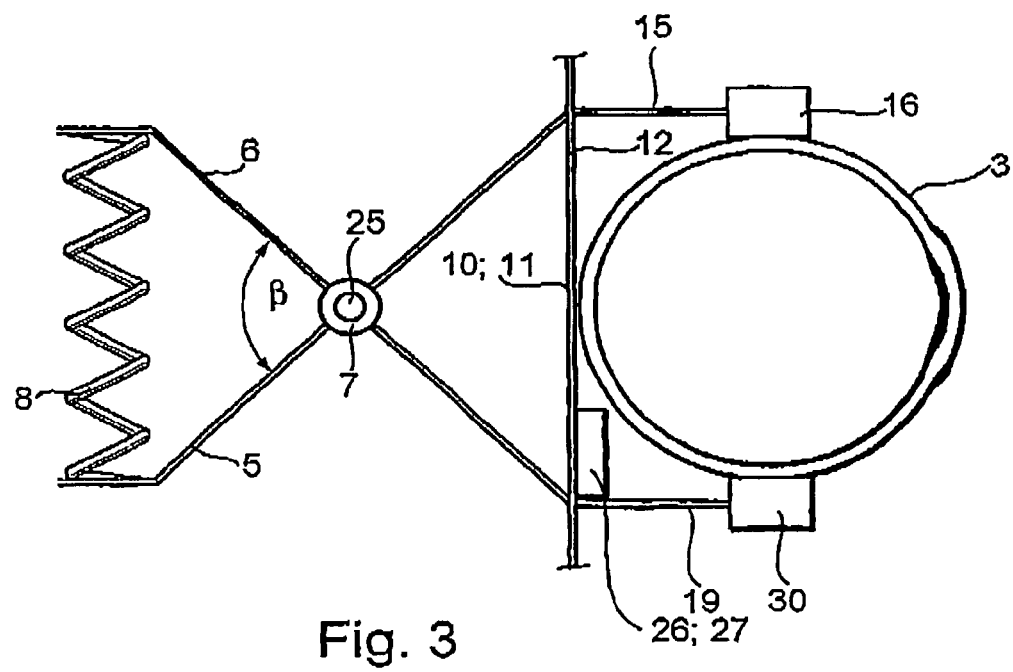
FIG. 3 in cross section, a second form of embodiment of the ultrasonic flow measuring device of the invention.
Figure 4:
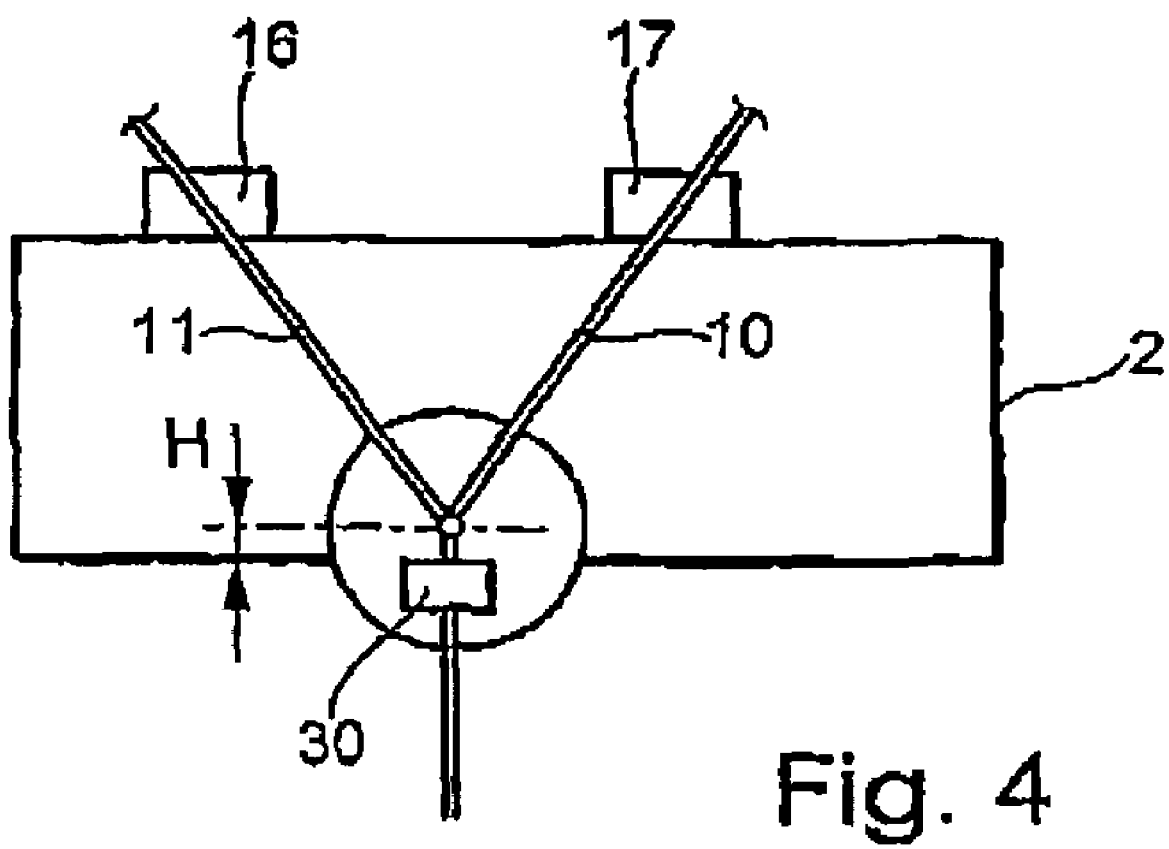
FIG. 4 an elevational view of the form of embodiment shown in FIG. 3.

FIG. 3 shows in cross section a second embodiment of the ultrasonic flow measuring device 1 of the invention; FIG. 4 shows the embodiment in side view. An essential difference compared to the ultrasonic flow measuring device 1 of FIGS. 1 and 2 is that, here, a third, additional, ultrasonic sensor 30 is arranged in the region of the holder 19.

Figure 5:
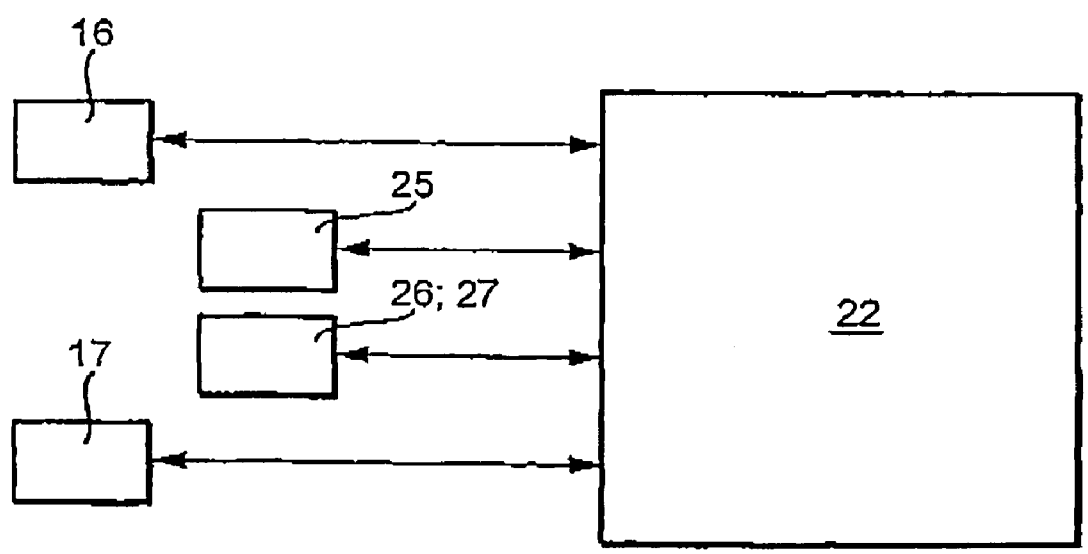
FIG. 5 a block diagram for the actuating of the flow measuring device of the invention.

FIG. 5 is a block diagram for the activating of the flow measuring device 1 of the invention. The control/evaluation unit 22 triggers emission of the ultrasonic measuring signals of the ultrasonic sensors 16, 17, and measures the time which elapses until the ultrasonic measuring signals are received in the respective other ultrasonic sensor 17; 16. On the basis of the difference of the travel times of the ultrasonic measuring signals in the flow direction and opposite to the flow direction, the control/evaluation unit 22 determines the volume- and/or mass-flowrate of the medium 3 through the pipeline 2.

Additionally, the control/evaluation unit 22 obtains from the rotation transmitter 26 the information concerning the angle α between the two guide rails 10, 11. Also, information concerning the height setting of the unit compensating for the wall thickness d of the pipeline 2 is made available to the control/evaluation unit 22 by the length sensor 27. Further made available to the control/evaluation unit 22 is the information concerning the outer diameter $D_a$ of the pipeline 2, by way of the angle β and the rotation transmitter 25.

LIST OF REFERENCE CHARACTERS 1 ultrasonic flow measuring device
2 pipeline
3 medium
4 clamping unit
5 first lever arm
6 second lever arm
7 first pivot connection
8 compression spring
9 second pivot connection
10 first guide rail
11 second guide rail
12 transverse member
13 holding element
14 connecting piece
15 connecting piece
16 ultrasonic sensor 17 ultrasonic sensor
18 tubular piece
19 holder
20 tubular piece
21 tubular piece
22 control/evaluation unit
23 tubular piece
24 tubular piece
25 rotation transmitter
26 rotation transmitter
27 length sensor
28 first portion
29 second portion
30 ultrasonic sensor
31 longitudinal axis
32 surface element
33 porting body
34 ultrasonic sensor

The invention claimed is:

1. An apparatus for determining and/or monitoring the volume- and/or mass-flow of a medium flowing through a pipeline and defining a stream direction, the pipeline defining an outer wall, comprising:
   at least two ultrasonic sensors, which are secured in a defined measuring positional relationship on the outer wall of the pipeline and which alternately emit and receive ultrasonic measuring signals; and
   a control/evaluation unit connected to said at least two ultrasonic sensors, which determines volume- and/or mass-flow of the medium in the pipeline on the basis of a travel time difference of the ultrasonic measuring signals in the stream direction and opposite to the stream direction, wherein:
   said at least two ultrasonic sensors are secured on a pliers-like clamping unit, which is embodied in such a manner that said at least two ultrasonic sensors are brought into a measuring positional relationship by clamping onto the outer wall of the pipeline.

2. An apparatus as claimed in claim 1, wherein:
   said pliers-like clamping unit is so embodied that said at least two ultrasonic sensors are automatically brought, when clamped onto the pipeline, into the measuring positional relationship, largely independently of the outer diameter of the pipeline.

3. The apparatus as claimed in claim 1, wherein:
   said pliers-like clamping unit is embodied in such a manner that said at least two ultrasonic sensors are arranged in the measuring positional relationship in a two, or more, traverse arrangement on a surface of the outer wall, essentially parallel to the longitudinal axis of the pipeline.

4. The apparatus as claimed in claim 1, wherein:
   said pliers-like clamping unit is embodied in such a manner that said at least two ultrasonic sensors are arranged in the measuring positional relationship on opposing sides of the pipeline in a one-traverse arrangement or in a multiple one-traverse arrangement.

5. The apparatus as claimed in claim 1, wherein:
   said pliers-like clamping unit comprises a first portion and a second portion.

6. The apparatus as claimed in claim 5, wherein:
   said first portion comprises two lever arms, which are coupled with one another in mid-regions thereof via a pivot connection.

7. The apparatus as claimed in claim 5, wherein:
   said second portion includes the following components: two guide rails arranged in V-shape and coupled together in connected end regions via a pivot connection; two securely-clampable pivot connections provided in free end regions of said guide rails and in end regions of a transverse member; two connecting pieces, on which said at least two ultrasonic sensors are secured; said transverse member, which is rigidly connected with said first lever arm of said first portion; and a holder, which is connected with said second lever arm of said first portion.

8. The apparatus as claimed in claim 1, further comprises:
   a first rotation transmitter, which determines the angle between said two lever arms, wherein:
   said control/evaluation unit determines, on the basis of the determined angle between said two lever arms the outer diameter of the pipeline.

9. The apparatus as claimed in claim 1, further comprising:
   at least one additional ultrasonic sensor, which determines the wall thickness of the pipeline.

10. The apparatus as claimed in claim 9, further comprising:
    a compensating unit which automatically compensates for the thickness of the wall of the pipeline by corresponding height displacement of said pliers-like clamping unit.

11. The apparatus as claimed in claim 10, further comprising:
    a second rotation transmitter and a length sensor, via which the influence of the wall of the pipeline on the travel time of the ultrasonic measuring signals is automatically taken into consideration.

* * * * *